(No Model.)
J. W. HYATT.
ART OF FILTRATION.
No. 293,747. Patented Feb. 19, 1884.
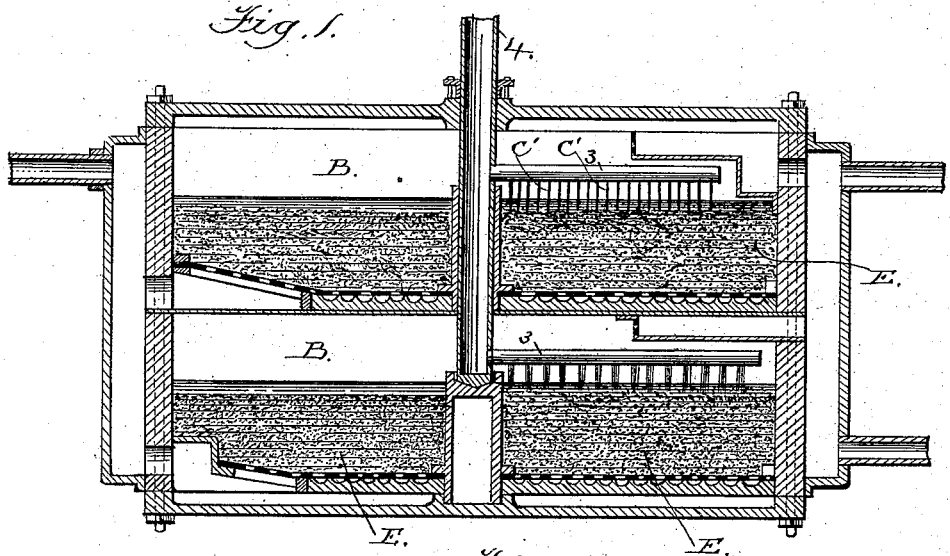
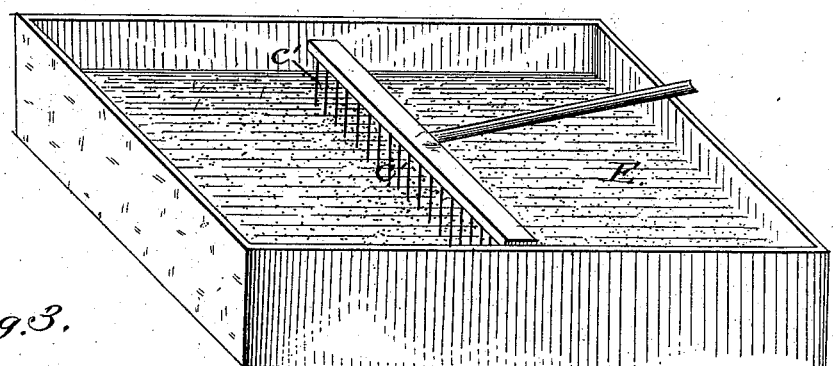
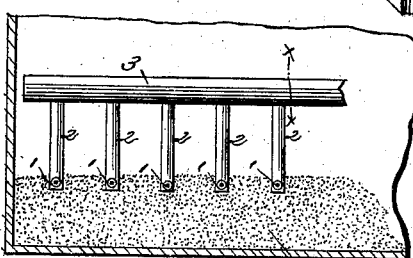
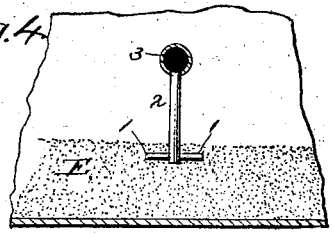
Witnesses;
J. Walter Fowler,
Chas. C. Gill.
Inventor;
John W. Hyatt,
By his Atty.
Rowland Cox

UNITED STATES PATENT OFFICE.

JOHN W. HYATT, OF NEWARK, NEW JERSEY.

ART OF FILTRATION.

SPECIFICATION forming part of Letters Patent No. 293,747, dated February 19, 1884.

Application filed June 18, 1881. Renewed May 11, 1882. Again renewed August 16, 1883. (No model.)

*To all whom it may concern:*

Be it known that I, JOHN W. HYATT, of Newark, in the county of Essex and State of New Jersey, have invented a new and useful Improvement in the Art of Filtration, of which the following is a specification, reference being had to the accompanying drawings.

The invention has relation to improvements in the art of filtration. It has been found that for purposes of filtration the best results are produced when a bed of material in granular form is employed; but difficulties in the use of material of this kind have heretofore arisen because the beds become impregnated or loaded with silt and other obnoxious material, whereby the filtration is rendered difficult, and in time becomes impossible. The accumulation of silt, &c., however, is mainly confined to the upper surface of the bed, a crust being formed which extends a short distance—usually only one-sixteenth of an inch, or thereabout—below the upper surface. Various means of correcting this difficulty have been devised, but very few have proved to be satisfactory.

The distinctive novelty of my invention consists in preventing the formation of this crust or deposit of silt or other obnoxious material by causing a substantially-continuous agitation of the upper part of the surface of the bed without disturbing the lower part, which serves to perform its office as a filtering agent, the agitation being continued without disturbing the filtration.

The invention consists in an improved method, and also in an apparatus or device by which the method may be practiced.

The nature of the method, as well as the construction of the apparatus, will be understood by reference to the accompanying drawings, in which I have shown several forms of apparatus that I have employed with satisfactory results, and which are adapted particularly to be used in connection with the apparatus heretofore patented by me, and to the Newark Filtering Company, as assignee of Patrick Clark, the Letters Patent for which are numbered 243,265 and 243,212, and dated June 21, 1881.

Referring to the drawings, Figure 1 is a central vertical longitudinal section of an apparatus embodying the elements of the invention, the blades or pins hereinafter mentioned being employed as agitators in the upper compartment, and jets of water in the lower compartment. Fig. 2 is a perspective view of a filter in which the agitation is effected by raking. Fig. 3 is a detached side view of a modified form of agitator. Fig. 4 is a section through the line $x\ x$ of Fig. 3; and Fig. 5 is a detached vertical section through the pipe C, having the pins or blades C'.

In Fig. 1 of the drawings, 4 is a vertical shaft, which extends through the middle of a case of appropriate construction, having the apartments B provided with independent filter-beds of granular material, the shaft being arranged to be actuated in any convenient way, either by hand or otherwise, as may be preferred. Connected with the central shaft, A, are the horizontal arms 3, one or more arms being provided for each section, and which in the present instance are provided upon their lower surfaces with a series of teeth or blades arranged by preference at different angles, as shown in Fig. 5. The beds E, of granular material, which are used to effectuate the filtration, are of such depth that when their upper surfaces are agitated the lower parts will remain undisturbed.

I have found by experience that if a bed—say ten inches deep—composed of ordinary sand is agitated at its upper surface for a depth of from one to two inches the lower parts will remain entirely undisturbed. Having this object in view, the blades or pins C' are of such length as to effectually agitate the upper layer of the sand without disturbing the lower part of the bed while the agitation of the upper part is taking place; but it is plain that the length of the pins or blades is a matter of judgment which will be governed by circumstances, the cardinal object being, as hereinbefore stated, to provide for a suitable agitation of the upper surface of the bed without disturbing the lower parts thereof. It is quite apparent that the pins may be of any construction that is preferred, and that the shape and number thereof may be varied at pleasure. By preference, the operation of the agitator (in the present instance the horizontal arm provided with blades or pins) will be continuous or repeated at short intervals. In the form of apparatus which I have described it will be convenient to cause a slow uninterrupted rotation of the arms 3; but of course a like result may be produced by actuating it at intervals, the essential consideration being, as hereinbefore recited, such an agitation of the upper part of the bed as will prevent the formation of the obnoxious crust.

In Figs. 3 and 4 is shown another form of apparatus which may be employed with entirely satisfactory results. It differs from that illustrated in Fig. 1 in that the agitation is effected by means of jets of water issuing from the pipes 1, which are short horizontal pipes secured to the lower ends of the vertical pipes 2, connecting with the pipes or arms 3, which radiate from a central rotating pipe, 4, and travel over the filter-beds. When in use, the pipe 4 will be connected with a suitable reservoir or other supply, whereby the water to be used in agitating the upper layer of the filter-beds may pass from the supply through the said pipe 4 into the pipes 3, and thence into the upper portion of the filter-bed through the pipes 2 and 1. The water being discharged in horizontal jets from the pipes 1, that portion of the filter-bed below them will remain undisturbed during the agitation. The pipes 2 will penetrate the filter-beds for about an inch or two, and will have an outlet in the short pipes 1. When the central pipe, 4, is rotated either continuously or intermittently, the pipes 2, passing through the upper layer of the filter-bed and the water issuing in jets at the same time, cause the same to be thoroughly agitated, whereby the formation of a coating or crust of silt or other material on the surface of the filter-bed is effectually prevented. The same object may be consummated—and I include this also within the scope of my invention—by simply employing the central pipe, 4, and the pipes 3, having apertures on their lower surface, and in so graduating the pressure of the water that the jets thereof issuing from the apertures will penetrate the filter-bed a distance just sufficient to agitate the upper surface or layer thereof without disturbing its lower portions. The degree of pressure on the water will of course be varied according to the thickness of the bed and the material employed. It is plain that this method of agitation could be substituted for the use of the teeth and pipes hereinbefore described with satisfactory results.

As hereinbefore set forth, unless an agitation of the filter-bed is effected in some way, a crust or coating of silt or other obnoxious material will quickly form upon the bed, and at first retard and finally prevent the passage of the water through the filter. Heretofore it has been the object of persons interested in the art to overcome this difficulty by agitating the whole or the greater portion of the filter-beds at intervals, governed according to the condition of the water and other circumstances, the process of filtering being stopped to permit the agitation. While this plan in a great measure obviates the difficulties mentioned, it is not without objections itself, the crust of silt (which even when very thin seriously retards the flow of water) quickly forms and requires the frequent washing and agitation of the filter-beds, and consequently frequent cessation in the operation of filtering. By my invention I prevent the formation of the crust of silt and avoid the necessity of washing the filter-beds except at long intervals.

According to the plans above set forth for giving effect to my invention it will be observed that the upper layer of the sand or other material is continuously or nearly continuously agitated and the formation of the crust prevented. After the upper layer of the beds has become so impregnated with silt and other matter as to impair the process of filtering, the bed may be cleansed by a reversal of the current of water through the apparatus, or by any of the means set forth and shown in the patents hereinbefore referred to, or otherwise. I prefer to use the means which I have described; but numerous others will suggest themselves to persons skilled in the art to which the invention relates. Any means whereby the agitation can be properly effected may be made use of, the only essential consideration being that the disturbance be sufficient to prevent the formation of the crust of obnoxious material without disturbing the lower part of the bed.

A single bed or a series of beds may be used at will, and may be constructed according to the circumstances of the case. Usually it will be expedient to have a continuous agitation; but a like result may be effected by operating the agitator at short intervals.

What I claim as new, and desire to secure by Letters Patent, is—

1. In the art of filtration by means of beds of granular material, the method of preventing the deposition of silt and other obnoxious substance, which consists in agitating the upper part of the bed to a sufficient depth without disturbing the lower part of the bed or interfering with its functions as a filtering agent, substantially as set forth.

2. In the art of filtration by means of beds of granular material, the method of preventing the deposition of silt and other obnoxious substance, which consists in the frequent or continuous agitation of the upper surface of the bed by raking without disturbing the lower part of the bed or interfering with its operation as a filtering agent, substantially as set forth.

3. A device for effecting the agitation of the upper layer of a filter-bed composed of material in reduced or granular form, consisting of the pipes 4, 3, 2, and 1, the last being adapted to be moved through the surface of the filter-bed and to issue jets of water therein, substantially as set forth.

In testimony that I claim the foregoing improvement in the art of filtration, as above described, I have hereunto set my hand this 7th day of June, 1881.

JOHN W. HYATT.

Witnesses:
CHAS. C. GILL,
S. WALTER FOWLER.